US006464899B1

(12) United States Patent
Haas et al.

(10) Patent No.: US 6,464,899 B1
(45) Date of Patent: Oct. 15, 2002

(54) PUTTY COMPOSITION CONTAINING A VAPOR PHASE CORROSION INHIBITOR

(75) Inventors: Hans E. Haas, Stow, OH (US); Matthew P. Burdzy, South Windsor, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 138 days.

(21) Appl. No.: 09/585,531

(22) Filed: Jun. 2, 2000

Related U.S. Application Data
(60) Provisional application No. 60/138,871, filed on Jun. 11, 1999.

(51) Int. Cl.[7] .................. C09K 15/02; C09K 15/08; C09K 15/12; C09K 15/18; C09K 15/20
(52) U.S. Cl. ................ 252/389.1; 252/389.53; 252/390; 252/392; 252/394; 252/181.2; 252/194; 422/9; 428/355 R
(58) Field of Search ............... 252/388, 389.1, 252/389.32, 389.53, 389.54, 390, 392, 393, 394, 181.2, 181.4, 181.5, 194; 422/9; 428/343, 355 R, 355 RA

(56) References Cited

U.S. PATENT DOCUMENTS

| | | | | |
|---|---|---|---|---|
| 4,051,066 A | * | 9/1977 | Miksic et al. ............... 427/216 |
| 4,104,327 A | * | 8/1978 | Inoue et al. | |
| 4,124,549 A | * | 11/1978 | Hashiudo et al. | |
| 4,165,266 A | * | 8/1979 | Stueber et al. ............... 427/44 |
| 4,275,835 A | | 6/1981 | Miksic et al. ............... 239/60 |
| 4,584,225 A | * | 4/1986 | Adelmir ....................... 428/71 |
| 4,950,523 A | * | 8/1990 | Raszewski ................. 428/159 |
| 4,973,448 A | | 11/1990 | Carlson et al. ............... 422/9 |
| 5,324,448 A | * | 6/1994 | Mayeaux ..................... 252/194 |
| 5,422,187 A | * | 6/1995 | Miksic et al. ............... 428/545 |
| 5,705,566 A | | 1/1998 | Todt .............................. 525/95 |
| 5,715,945 A | | 2/1998 | Chandler .................. 206/524.4 |
| 6,033,599 A | * | 3/2000 | Lozano et al. .......... 252/389.54 |

FOREIGN PATENT DOCUMENTS

EP 0 753989 1/1997 ............ H05K/3/28

* cited by examiner

*Primary Examiner*—Joseph D. Anthony
(74) *Attorney, Agent, or Firm*—Steven C. Bauman

(57) ABSTRACT

Compositions and methods for inhibiting corrosion of metallic surfaces are disclosed. The corrosion-inhibiting compositions are cost efficient, easy to use and can be conveniently removed or replaced. The corrosion-inhibiting compositions include a putty-like base material that is pliable and has sufficient tackiness to be securely affixed to surfaces. Corrosion inhibiting compounds are combined with the base material. These compositions provide a vapor phase corrosion inhibitor for both direct and indirect contact with metallic objects.

12 Claims, 1 Drawing Sheet

PUTTY COMPOSITION CONTAINING A VAPOR PHASE CORROSION INHIBITOR

This application claims the benefit of provisional application No. 60/138,871, Jun. 11, 1999.

BACKGROUND OF THE INVENTION

The present invention relates generally to corrosion protection through the use of a composition for providing a vapor phase corrosion inhibitor in a putty-like base to a substrate.

BRIEF DESCRIPTION OF RELATED TECHNOLOGY

Corrosion is often a major problem during the transportation and storage of corrodible items, such as metallic articles. Metallic articles formed from iron, steel, copper, brass, aluminum, silver as well as other metals and alloys of such metals, are susceptible to corrosion. Corrosion can lead to tarnishing, discoloring or pitting of a metallic surface in the presence of oxygen and water. Because both oxygen and water are presently available under atmospheric and ambient conditions, precautions are necessary when packaging or storing such metallic items to prevent or minimize corrosive effects. Such corrosion oftentimes can occur after the manufacture of the articles, but prior to distribution to the ultimate consumer.

Conventional precautions for preventing corrosion include the use of volatile corrosion inhibitors (VCI) or vapor phase corrosion inhibitors (VPCI). These corrosion inhibitors react with a metallic surface to impede oxidation of the surface (anodic reaction) or to impede reduction of elementary oxygen to hydroxide ions (cathodic reaction). VCI and VPCI treatments require evaporation or sublimation of an inhibitor to provide a protective layer through deposition or condensation at the anodic or cathodic areas of a corrodible surface. Corrosion inhibitors work best in defined vapor spaces because to effectively treat metallic surfaces an adequate vapor pressure of the inhibitor should be achieved. A container or a wrapping material may be used to enclose a metallic object and form a vapor space into which the corrosion inhibitor may be located. Such container or wrapping material also acts as a barrier against atmospheric moisture from repeatedly contacting the metallic object.

In one known application a coating is purposely placed on an object with the intention of not being removed by the end user. Such a coating acts as a barrier to moisture and may contain a vapor phase corrosion inhibitor. For instance, European Patent Application EP/0,753,989 A1 discloses a conformal coating containing a vapor phase inhibitor for use with electronic circuit boards. The conformal coating is said to coat copper surfaces of the circuit boards with a vapor phase inhibitor offering protection against oxidation of the copper surfaces. A disadvantage of this technique is that a second coating is required to guard against small or pin-size holes in the coating that, when not covered, can lead to undesirable corrosion. Applying a second coating to protect against failure of a first conformal coating adds labor and material costs, as well as processing time and a discontinuity in the manufacture process, which can lead to making an otherwise moderate costing manufacture operation into an expensive one.

Another conventional technique for providing corrosion protection is to apply to a metallic surface a coating of a grease or paraffinic material that contains a vapor phase inhibitor. The material, when applied in a sufficiently thick layer, will act as a barrier to moisture, and the vapor phase inhibitor that is incorporated into this material will add further protection against corrosion. This technique, however, also suffers the disadvantage of being relatively expensive and inconvenient because the ultimate user typically removes the coating prior to use. Removal of the coating is often time-consuming and expensive.

To avoid the expense of removing a coating or the necessity of applying multiple coatings to achieve corrosion protection of a metallic surface, a vapor phase inhibitor may be included within a container or wrapping material that encloses a metallic object. U.S. Pat. No. 5,705,566 discloses a hot melt adhesive that includes particles of a vapor corrosion inhibitor mixed therein. The hot melt adhesive seals the flaps or seams of the container. A disadvantage of this technique is that corrosion protection of the metallic object placed within the container may be impaired because the inhibitor is not located on innermost interior surfaces of the container.

U.S. Pat. No. 5,715,945 discloses film packaging materials that contain vapor phase inhibitors. Such packaging materials can be used to wrap a metallic object to offer a protective barrier against atmospheric moisture. The vapor phase inhibitors mixed into these materials are intended to offer protection against corrosion of the metallic object enclosed within the packaging materials. This technique suffers from the disadvantage that the vapor phase inhibitor will often start to sublime after being mixed into the wrapping material, resulting in less available vapor phase inhibitor once the film is incorporated into an actual wrapping for the metallic object. After long periods of storage or transportation, the object may require fresh wrapping with material containing additional active vapor phase corrosion inhibitor. Often the wrapping material that contained the exhausted vapor phase corrosion inhibitor will have to be removed from around the metallic object. Such removal and re-wrapping of these materials is, especially for large metallic objects, time-consuming and expensive.

U.S. Pat. No. 4,973,448 discloses packets formed of sealed sheets of non-woven material that contain, among other things, a vapor phase inhibitor. Such packets are placed within a container or a wrapping film to provide corrosion protection of a metallic object placed therein. These packets may also contain a desiccant to further guard against moisture affecting the enclosed metallic object. As disclosed in U.S. Pat. No. 4,275,835, a package may have an adhesive layer on one of its outer surfaces for adhesively securing the package within an enclosure. A disadvantage of these prepackaged vapor phase inhibitors is that the packing of the inhibitors into the non-woven material is expensive and time-consuming. Furthermore, surfaces within cavities of a metallic object often demand special consideration for corrosion protection because such cavities create harbors where moisture can collect. Such prepackaged packets of vapor phase corrosion inhibitors are often sized too large to be placed within cavities of a metallic object because as the size of the packets are reduced the cost of the packaging of the packets increases relative to the cost associated with the vapor phase inhibitor contained therein.

While conventional techniques offer some protection against corrosion, they suffer from the disadvantages previously described. As such, there is a need for a simple, easy to use product that prevents corrosion and that can be easily be applied within protective barriers.

SUMMARY OF THE INVENTION

The present invention provides compositions which include a releasable vapor phase corrosion inhibitor for protecting metallic substrates against corrosion. These compositions are capable of both direct and indirect contact with metallic objects. The present invention also provides for methods of preparing the compositions, articles of manufacture and methods of producing them.

The compositions of the present invention include a base material that is pliable and has sufficient tackiness to be securely affixed to surfaces. This base material can be described as having physical characteristics of a putty or putty-like material. The base material includes a releasable vapor phase corrosion inhibitor which sublimes or evaporates and offers corrosion protection to metallic surfaces within an enclosed vapor space that is not in direct contact with the inventive compositions.

Examples of the base materials useful in the inventive compositions include silicones; fluorosilicones; polyurethanes; polysulfides; polybutylenes (polymers based on $C_4$ monomers); polyvinyl chloride; acrylic resins; vinyl acetate; ethylene vinyl acetate; vinyl acrylic (copolymers of vinyl acetate and alkyl acrylates such as butyl acrylate); styrene butadiene rubber (SBR); styrenic block copolymers; oleoresinous compositions; bituminous; rosin; unsaturated elastomers such as polybutadiene, polyisoprene and polychloroprene; and saturated elastomers such as polyisobutylene, ethylene propylenediene monomer rubber (EPDM), ethylene-propylene copolymers (EPR—Ethylene Propylene rubber), nitrile-butadiene rubber, and polybutene.

The pliability and tackiness of the base material allows the present invention to be used to offer corrosion protection to cavities of metallic objects. The inventive compositions can be placed over surfaces proximal to the cavity to guard against moisture reaching locations within the cavity. The corrosion inhibitor releasably contained in the base protects the metallic surfaces within the cavity.

The corrosion product of the present invention may also be used as a temporary coating to provide direct contact corrosion protection. The base material of the present invention can be easily removed from metallic surfaces without leaving undesirable residues of material.

Certain useful corrosion inhibitors of the present invention include sodium nitrite, dicyclohexylamine, sodium benzoate, hexadecylpyridinium iodide; dodecylbenzyl quinolinium bromide; propargyl quinolinium bromide; cyclohexylammonium benzoate; ammonium benzoate; dicyclohexylammonium nitrite and dicyclohexylamine chromate, benzotriazole; sodium dinonylnaphthalene sulfonate; triethanolamine dinonylnaphthalene sulfonate; calcium dinonylnaphthalene sulfonate; magnesium dinonylnaphthalene sulfonate; barium dinonylnaphthalene sulfonate; zinc dinonylnaphthalene sulfonate; lithium dinonylnaphthalene sulfonate; ammonium dinonylnaphthalene sulfonate; ethylenediamine dinonylnaphthalene sulfonate; diethylenetriamine dinonylnaphthalene sulfonate and 2-methylpentanediamine dinonylnaphthalene sulfonate; sodium molybdate, or their salts and combinations thereof.

In certain embodiments of the present invention, the corrosion protection product includes a moisture absorbing compound to further guard against corrosion. Such moisture-absorbing compound can also contain an indicator revealing a color change when the moisture absorbency of the compound is utilized. Such a color change can indicate that additional product may be applied to maintain adequate levels of corrosion protective material.

One advantage of the present invention is that it provides a composition and delivery vehicle for corrosion inhibitors which is cost efficient, easy to use and can be conveniently removed or replaced.

DETAILED DESCRIPTION OF THE INVENTION

Figure 2:
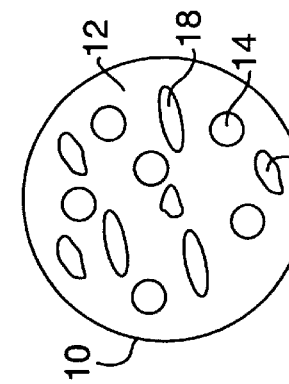
FIG. 2 is a cross sectional view of the corrosion inhibiting product of FIG. 1 taken along the A—A axis.

The present invention relates to a corrosion inhibiting composition that includes a vapor phase corrosion inhibitor and base material which serves as a delivery vehicle for the corrosion inhibitor. The base material is capable of both storing and releasing the corrosion inhibitor, capable of being adhered to surfaces, and capable of sealing potential leak paths in enclosures. The base material of the present invention allows for easy and convenient placement of the corrosion inhibiting composition to effectuate corrosion protection of metallic articles. The base material is typically attached to a surface in vapor communication with a metallic article within an enclosure containing the metallic article. Oftentimes the base material is placed proximal to or onto the metallic surface of a corrodible item. The base material is capable of releasing corrosion inhibiting vapors to effect metallic surfaces, thereby impeding anodic and/or cathodic reactions and inhibiting any subsequent corrosion.

The compositions of the present invention further include a base material that is pliable and has sufficient tackiness to be securely affixed to surfaces. This base material can be described as having physical characteristics of a putty or putty-like material. The base material can be easily cut to different sizes to apply different quantities of vapor phase corrosion inhibitor incorporated into the putty of the present invention. The base material includes a releasable vapor phase corrosion inhibitor which sublimes or evaporates and offers corrosion protection to metallic surfaces within an enclosed vapor space that are not in direct contact with the putty to protect metal objects therein.

The pliability and tackiness of the putty allows the present invention to be used to offer corrosion protection to cavities of metallic objects. The putty can be placed over surfaces proximal to the cavity to guard against moisture reaching locations within the cavity. The corrosion inhibitor releasably contained in the putty protects the metallic surfaces within the cavity. Furthermore, the compositions is used to seal leak paths in enclosures, such as junction boxes for electronic circuits, to further protect metallic objects therein.

The corrosion product of the present invention may also be used as a temporary coating to provide direct contact corrosion protection. The putty of the present invention can be easily removed from metallic surfaces without leaving undesirable residues of material.

The inhibitor used in the present invention is vaporizable under ambient conditions to effect a metallic surface and inhibit corrosion thereat. As used herein, the term "vaporizable" and its variants refer to a solid or liquid that is capable of turning into a vapor at least at ambient conditions without application of heat. For example, the corrosion inhibitor of the present invention may be a vaporizable solid that is capable of subliming into its vapor, or may be a vaporizable liquid that is capable of evaporating into its vapor at typical ambient conditions of atmospheric pressure and room-temperature (20° C.). Heat may be applied, if desired, to initiate or accelerate vaporization, but is generally not required if the vapor pressure of the inhibitor is sufficiently high.

Virtually any corrosion inhibitor which is compatible with the base material and which is releasably contained within the base material is useful. The corrosion inhibiting composition of the present invention can inhibit both anodic and cathodic reactions by including certain types of corrosion inhibitors, such as organic and inorganic nitrogen compounds, sulfonates, phosphate compounds and combinations thereof. The corrosion inhibitors of the present invention are desirably substantially anhydrous to minimize the exposure of a corrodible metallic surface to moisture. The corrosion inhibitors desirably have a vapor pressure of about $10^{-2}$ to $10^{-5}$ mm Hg at about 20° C. Such a vapor pressure allows the delivery vehicle to release the inhibitor to effect a proximal metallic surface of a corrodible item.

Desirably the corrosion inhibiting composition of the present invention includes more than one vapor phase corrosion inhibitor. For example, corrosion inhibitors having different vapor pressures may suitably be selected to provide for a controlled release of the vapor phase inhibitors from the composition over time. In such a manner, a high vapor pressure corrosion inhibitor offers initial corrosion protection to an article due to its high release rate while a low vapor pressure corrosion inhibitor offers sustained corrosion protection due to its lower release rate.

Certain useful corrosion inhibitors of the present invention include sodium nitrite, dicyclohexylamine, sodium benzoate, hexadecylpyridinium iodide; dodecylbenzyl quinolinium bromide; propargyl quinolinium bromide; cyclohexylammonium benzoate; ammonium benzoate; dicyclohexylammonium nitrite and dicyclohexylamine chromate, benzotriazole; sodium dinonylnaphthalene sulfonate; triethanolamine dinonylnaphthalene sulfonate; calcium dinonylnaphthalene sulfonate; magnesium dinonylnaphthalene sulfonate; barium dinonylnaphthalene sulfonate; zinc dinonylnaphthalene sulfonate; lithium dinonylnaphthalene sulfonate; ammonium dinonylnaphthalene sulfonate; ethylenediamine dinonylnaphthalene sulfonate; diethylenetriamine dinonylnaphthalene sulfonate and 2-methylpentanediamine dinonylnaphthalene sulfonate; sodium molybdate, or their salts and combinations thereof.

Additional useful corrosion inhibitors include triazoles, inorganic and organic nitrites, nitrates, phosphates, carbonates, and aliphatic and aromatic amines or their salts that are believed to migrate to the surface in the presence of water vapor and provide corrosion protection. These corrosion inhibitors may suitably be used in the present invention. Such compositions are described for instance in U.S. Pat. No. 4,973,448 (Carlson); U.S. Pat. No. 4,051,066 (Miksic); U.S. Pat. No. 4,275,835 (Miksic); and U.S. Pat. No. 5,139,700 (Miksic).

Examples of nitrite compounds that are effective as corrosion inhibitors include sodium nitrite, dicyclohexyl ammonium nitrite, diisopropyl ammonium nitrite and nitronaphtaline ammonium nitrite.

A variety of different classes of useful corrosion inhibitors include alcohols and diols; primary amines; secondary amines; tertiary amines; diamines; aliphatic polyamines; ethers, thioethers and thioesters; aldehydes; organic acids; salts of aromatic organic acids; salts of quaternary ammonium compounds; amine salts; nonaromatic heterocyclic amines; heterocyclic amines; alkanolamines $[NH_{3-n}(ROH)_n]$ and substituted alkanolamines; thiols (mercaptans); sulfoxides; thiourea and substituted thioureas; substituted thiocarbonyl esters; phosphonium salts; arsonium salts; molybdates and combinations thereof.

Examples of alcohols and diols useful in the present invention include propargyl alcohol; 2-butyn-1,4-diol; and 5-diethylamino-4-pentyn-2-ol.

Examples of primary amines useful in the present invention include allylamine; methylamine; ethylamine, n-propylamine; n-butylamine; n-octylamine; n-decylamine; n-tetradecylamine; n-octadecylamine and cyclohexylamine. Examples of secondary amines useful in the present invention include methylpropylamine; diethylamine; dibutylamine; diamylamine; di-n-octylamine; 3-isopropylamino-1-butyne; 3-benzylamino-1-butyne and dicyclohexylamine. Examples of tertiary amines useful in the present invention include triethylamine; tripropylamine; tributylamine and tri-n-octylamine.

Examples of diamines useful in the present invention include n-hexadycyl propylene diamine and n-dodecyl b-methylene diamine.

Examples of aliphatic polyamines useful in the present invention include diethylenetriamine; triethylenetetramine and tetraethylenepentamine.

Examples of ethers, thioethers and thioesters useful in the present invention include dipropargyl ether; dipropargyl thioether and propargyl caproate.

Examples of aldehydes useful in the present invention include cinnamic aldehyde and furfuraldehyde.

Examples of organic acids useful in the present invention include acetic acid; propionic acid; n-butyric acid; n-valeric acid; n-caproic acid; n-caprylic acid; acrylic acid; maleic acid; succinic acid; alkenyl succinic acid; 9,11-octadecadienoic acid and nicotinic acid.

Examples of salts of aromatic organic acids useful in the present invention include sodium benzoate; sodium salicylate and sodium cinnamate. Examples of salts of quaternary ammonium compounds useful in the present invention include dodecylbenzyldimethylammonium chloride; decamethylene bis-dimethyl hexadecyl ammonium bromide; dioctadecyldimethylammonium chloride and tetrabutylammonium chloride.

Examples of amine salts useful in the present invention include hexadecylpyridinium iodide; dodecylbenzyl quinolinium bromide; propargyl quinolinium bromide; cyclohexylammonium benzoate; ammonium benzoate; dicyclohexylammonium nitrite and dicyclohexylamine chromate. Examples of aromatic amines useful in the present invention include aniline; m-aminophenol; p-aminophenol; 3,5-diaminobenzoic acid; o-toluidine; m-toluidine; n,n-dialkylaniline (r=methyl or ethyl). Examples of nonaromatic heterocyclic amines useful in the present invention include hexamethyleneimine; hexamethylenetetramine; d-oximino-b-vinyl quinuclidine; decamethyleneimine; hexamethyleneiminebenzoate and hexamethyleneimine-3,5-dinitrobenzoate. Examples of heterocyclic amines useful in the present invention include 6-n-ethyl purine; 1-ethylamino-2-octadecylimidazoline; 1-hydroxyethyl 2-octadecylimidazoline; benzotriazole; 8-hyroxyquinoline; pyridine; diethylthiophosphate; 2-picoline; 3-picoline; 4-picoline; 2,4-lutidine; 4-ethylpyridine; poly-(4-vinylpryridine); quinoline; 2,6-dimethylquinoline; acridine; imidazole; 4,5-diphenylimidazole; benzimidazole; 1-methylbenzimidazole; 1-phenylbenzimidazole and 2-phenylbenzimidazole.

Examples of alkanolamines [$NH_{3-n}(ROH)_n$] and substituted alkanolamines useful in the present invention include monoethanolamine; diethanolamine; triethanolamine; morpholine; aminoethylethanolamine; diaminoethanolamine; phenylethanolamine and phenyldiethanolamine.

Examples of thiols (mercaptans) useful in the present invention include butylmercaptan, laurylmercaptan, benzylmercaptan; phenylethylmercaptan, thiophenol, o-thiocresol and 2-mercaptobenzothiazole.

Examples of thioethers useful in the present invention include diethylsulfide, di-sec-butylsulfide, didecylsulfide, ethyl-n-octyl sulfide; diphenylsulfide, phenylbenzyl sulfide; dibenzylsulfide and xylenol polysulfide.

Examples of sulfoxides useful in the present invention include dimethysulfoxide; di-n-butylsulfoxide; tetramethylenesulfoxide; diphenylsulfoxide; di-p-tolylsulfoxide and dibenzylsulfoxide.

Examples of thiourea and substituted thioureas useful in the present invention include thiourea; allylthiourea; phenylthiourea and 1,3-diphenylthiourea.

An example of a substituted thiocarbonyl ester useful in the present invention includes ethyleneglycol bis-dibenzylxanthate.

Examples of phosphonium salts useful in the present invention include dimethyloctadecylphosphonium bromide; tetraphenylphosphonium chloride and triphenylbenzylphosphonium chloride. Examples of arsonium salts useful in the present invention include tetraphenylarsonium chloride and triphenylbenzylarsonium chloride. Examples of phosphates useful in the present invention include diethylthiophosphate; dioctylthiophosphate and tributylselenophosphate.

Examples of sulfonates useful in the present invention include sodium dinonylnaphthalene sulfonate; triethanolamine dinonylnaphthalene sulfonate; calcium dinonylnaphthalene sulfonate; magnesium dinonylnaphthalene sulfonate; barium dinonylnaphthalene sulfonate; zinc dinonylnaphthalene sulfonate; lithium dinonylnaphthalene sulfonate; ammonium dinonylnaphthalene sulfonate; ethylenediamine dinonylnaphthalene sulfonate; diethylenetriamine dinonylnaphthalene sulfonate and 2-methylpentanediamine dinonylnaphthalene sulfonate.

Examples of molybdates useful in the present invention include anhydrous sodium molybdate [$Na_2MoO_4$]; anhydrous ammonium dimolybdate [$(NH_4)_2MoO_4$] and anhydrous amine-molybdates, such as dicyclohexylamine molybdate, 2-ethylhexylamine molybdate and cyclohexylamine molybdate.

The base material of the present invention is desirably a deformable and pliable material that has sufficient tackiness or viscidity to be securely affixed or adhered to surfaces, such as metallic, paper, plastic and glass surfaces. In one desired embodiment, the base material has sufficient tackiness to remain affixed to a surface against its own weight under the force of gravity. In another desirable embodiment, the base material has sufficient tackiness to remain affixed to a surface against moderate shearing forces, such as those shearing forces experienced in handling and shipping of articles as the articles are moved in transit, for instance ocean transit. In a further desirable embodiment, the degree of tackiness is set so that the base material is easily removed by hand from a surface. One non-limiting method for imparting tackiness or viscidity is to combine talc with the pliable material. The base material desirably retains its deformability and pliability over a substantial time period to allow release of the corrosion inhibitors contained therewith. In other words, the base material desirably does not dry out or crack in a manner which unduly limits the release of the corrosion inhibitors.

The base material is further characterized as a putty or putty-like substance having viscoelastic and/or viscoplastic characteristics. Such characteristics describe a plastically deformable material having finite fluidity which will not flow until a critical yield stress is exceeded. In one desired embodiment, the base material is an elastomeric material that deforms under stress and substantially retains the deformed shape upon the removal of the stress. In a further desirable embodiment, the base material is easily shaped by hand at the location of application and easily cut to the desired amount.

Examples of the base materials that can be used as the delivery vehicle include silicones; fluorosilicones; polyurethanes; polysulfides; polybutylenes (polymers based on $C_4$ monomers); polyvinyl chloride; acrylic resins; vinyl acetate; ethylene vinyl acetate; vinyl acrylic (copolymers of vinyl acetate and alkyl acrylates such as butyl acrylate); styrene butadiene rubber (SBR); styrenic block copolymers; oleoresinous compositions; bituminous; rosin; unsaturated elastomers such as polybutadiene, polyisoprene and polychloroprene; and saturated elastomers such as polyisobutylene, ethylene propylenediene monomer rubber (EPDM), ethylene-propylene copolymers (EPR—Ethylene Propylene rubber), nitrile-butadiene rubber, and polybutene.

The base material is desirably substantially anhydrous to minimize exposure of a metallic surface to moisture because moisture often promotes corrosion mechanisms. As used herein, the term "substantially anhydrous" means substantially free of the inclusion intended water, but allows for incidental amounts of water due to, for example, hygroscopic effects.

The base materials are desirably selected to achieve putty-like characteristics. To achieve these characteristics certain properties, for instance, molecular weight of polymeric base materials, may be controlled so that the base material has a finite fluidity to remain plastically deformable. Additionally, base materials are often combined with other materials, such as fillers, pigments, organic solvents, tackifiers, and the like to adjust the desirable putty-like characteristics of the inventive compositions. The base material, including these other materials, constitutes from about 10% to about 90% by weight of the total inventive composition with the remaining weight percent being from about 90% to about 10% of other constituents, such as corrosion inhibitors, desiccants and moisture indicators.

In one embodiment, the base material may be a rosin of the following composition on a weight percent basis of the base material: from about 25% to about 40% by weight modified rosin, from about 40% to about 60% by weight kaolin clay and with a balance of fillers, pigments and other additives. More desirably the rosin base is from about 30 to about 35% by weight modified rosin, from about 50% to about 55% by weight kaolin clay, from about 10% to about 15% by weight isopropyl alcohol and about 1% by weight pigments.

In another embodiment, the base material is a bituminous material from about 20% to about 50% by weight asphalt, from about 5% to about 40% by weight butyl rubber, from about 1% to about 10% by weight polybutene, from about 1% to about 20% by weight tackifier, from about 10% to about 15% by weight clay and from about 10% to about 15% by weight calcium carbonate on a total base material weight basis. More desirably, the base material contains from about 30% to about 40% by weight asphalt, from about 10% to about 35% by weight butyl rubber, from about 1% to about 10% by weight polybutene, from about 1% to about 20% by weight tackifier, from about 10% to about 15% by weight clay and from about 10% to about 15% by weight calcium carbonate on a total base material weight basis.

In still another embodiment, the base material is an oleoresinous putty or caulk. On a total base material weight basis, such a material may be formed by combining from about 5% to about 15% by weight linseed or vegetable (e.g. soy) oil with from about 80% to about 90% by weight calcium carbonate ($CaCO_3$) and with a balance of other additives. More desirably, such a material contains from about 7% to about 12% by weight linseed or vegetable oil, from about 85% to about 90% by weight calcium carbonate, from about 1% to about 2% by weight mineral spirits, from about 1% to about 2% by weight talc and about 0.3% by weight soya fatty acid on a total base material weight basis.

In another version of this embodiment, the oleoresinous putty or caulk material is modified with from about 1% to 10% by weight polybutene. More desirably, the polybutene modified material has a composition from about 5% to about 7% by weight linseed or vegetable oil, from about 85% to about 90% by weight calcium carbonate, from about 1% to about 2% by weight mineral spirits, from about 1% to about 2% by weight talc and about 0.3% by weight soya fatty acid, from about 2% to about 5% by weight polybutene and about 0.02% by weight cobalt naphthenate on a total base material weight basis.

In a further embodiment, the base material is an acrylic resin which contains from about 60% to about 80% by weight dimethacrylate esters, from about 10% to about 25% by weight high boiling point methacrylate esters and a balance of fillers, pigments and other additives on a total base material weight basis. More desirably, the base material contains from about 70% to about 75% by weight dimethacrylate esters, from about 15% to about 20% by weight high boiling point methacrylate on a total base material weight basis and a balance of other additives, such as hydroxyalkyl methacrylate, nonionic surfactant and substituted nitrile.

In yet another embodiment, the base material is made from an acetate resin, such as a vinyl acetate-ethylene latex with about 55% by weight solids. Such a latex is present from about 20% to about 60% by weight on a total base material weight basis with the balance being fillers, pigments or other additives. More desirably the vinyl acetate-ethylene latex with about 55% by weight solids is present from about 32% to about 42% by weight on a total base material weight basis.

The above-described base materials may further include fillers, pigments and other additives to control the putty-like characteristics of the delivery vehicle. For example, organic solvents may be added to increase fluidity of a base material. Nonlimiting examples of organic solvents that may suitably be used include: ketone solvents, such as methyl ethyl ketone; alcohol solvents, such as ethyl or isopropyl alcohol; methylene chloride; industrial spirits or the like. Talc or other tackifiers may be included to adjust the tackiness of the base material. Furthermore, titanium dioxide or other suitable inorganic oxide may also be included to adjust the pliability and deformability characteristics of the base material. These fillers, pigments and other additives may be present from about 1% to about 40% by weight of the total base material depending upon the properties of the base material.

The corrosion inhibitor may be combined with the base material by conventional techniques. One method for combining these materials is to compound the inhibitor into the base material. Other methods, such as stirring, blending or kneading, may suitably be used. A uniform mixture of the inhibitor throughout the base material is easily obtained, but such a uniform mixture is not required for acceptable levels of corrosion protection. Furthermore, a corrosion inhibitor which is encapsulated within some material, such as a gel, to control its vapor release may suitably be used with the present invention.

The corrosion inhibitor can generally be combined with the base material in any quantity as long as the resulting combination substantially retains the putty-like properties attributable to the base material. The corrosion inhibiting composition of the present invention contains quantities of corrosion inhibitors ranging from about 0.1 to about 90% by weight of the inventive composition. Desirably, the corrosion inhibiting composition contains from about 2 to about 30% by weight corrosion inhibitor on a total inventive composition basis. The particular amount of corrosion inhibitor to be combined with the base material will depend on many factors, including but not limited to the desired release rate and release duration of the inhibitor, and the environmental conditions into which the corrosion inhibiting composition will be placed.

The base material may be either cellular, noncellular or a combination of both. A cellular base material contains the corrosion inhibitor within interstices or pores of the cellular material. The corrosion inhibitor easily vaporizes from these pores, especially when the pores are open cells. A cellular base material may be formed by blowing or foaming techniques with a medium, for instance air, which reduces the density of the base material by forming interstices therein.

Alternatively, non-cellular base materials may be used to store and release the corrosion inhibitor. The rate of release of the inhibitor from the base material generally depends upon such factors as (1) the polymer chain length of the base material, (2) the degree of linearity of the base material, as compared to the degree of crosslinking, (3) the concentration of the corrosion inhibitor in the base material and (4) the nature of the corrosion inhibitor, such as its vapor pressure. The release rate of the corrosion inhibitor generally increases with a corresponding increase in polymer chain length, linearity or openness of the molecular structure and concentration of the corrosion inhibitor as well as by using higher vapor pressure corrosion inhibitors.

The shape of the articles made from composition can be virtually any shape.

Figure 1:
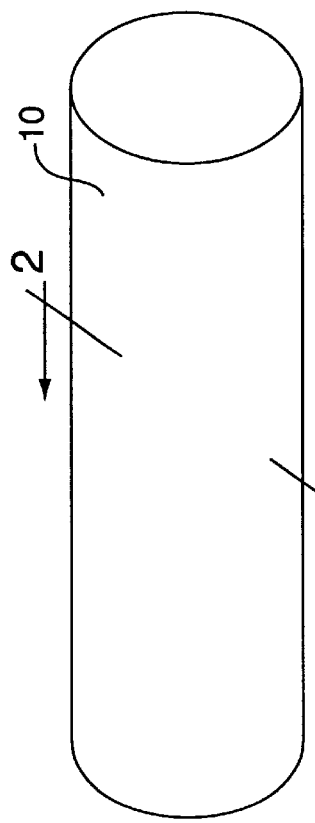
FIG. 1 is a perspective view of the corrosion inhibiting product of the present invention which is depicted in a rope form.

Generally the shape is designed for a specific application. For example as depicted in FIG. 1, the corrosion inhibiting composition 10 of the present invention may be formed into a cylindrical or a rope form. Other shapes, such as strips, blocks, spheres or even irregular or amorphous shapes, may suitably be used.

As depicted in a cross sectional view in FIG. 2, corrosion inhibitor 14 is combined with base material 12 to form the corrosion inhibiting composition 10. Other additives, such as desiccant 16 and color indicator 18 may also be combined with base material 14. Different shapes of the additives are presented in FIG. 2. These materials, such as corrosion inhibitor 14, desiccant 16 and color indicator 18, may be regular or irregular solid shapes or even pools of liquid contained within base material 12. Furthermore, additives such as these may be separate constituents, as depicted in FIG. 2, or may be combined. For example, color indicator 18 may be incorporated into desiccant 16.

Figure 3:
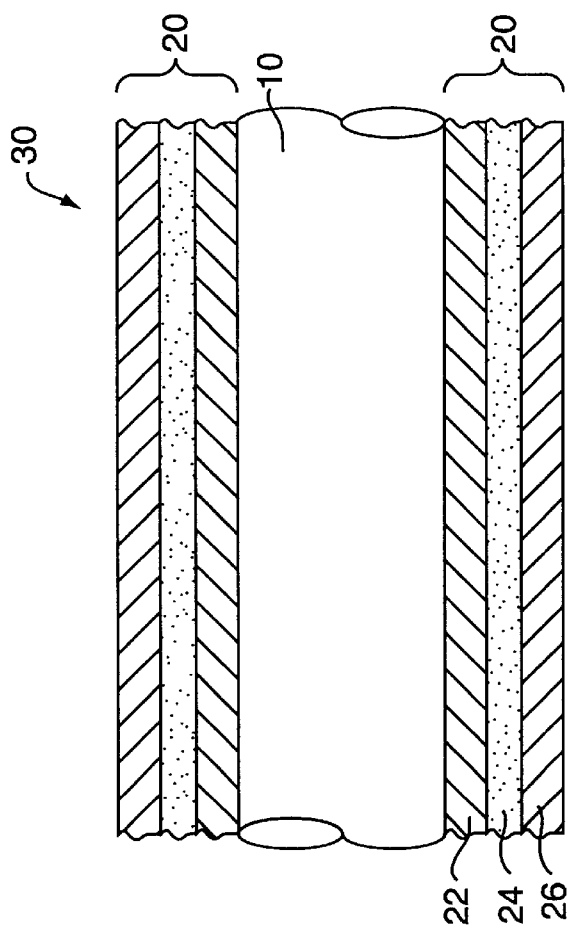
FIG. 3 is an illustration of a layered film for protectively storing the corrosion inhibiting product of the present invention.

The corrosion inhibiting composition of the present invention may be stored in containers that seal the composition until its use as a corrosion inhibitor is desired. FIG. 3 depicts an embodiment of the present invention for a corrosion inhibitor product 30. Corrosion inhibiting composition 10 is contained within multi-layer film 20. Multi-layer film 20 is a substantially gas impermeable film that impedes the release of the corrosion inhibitor vapors therethrough. Multi-layer 20 includes metallized layer 22, outer layer 26 and an adhesive layer 24 that binds metallized layer 22 to outer layer 26. Metallizied layer 22 desirably is sufficiently impermeable to prevent the vaporization of the corrosion inhibitor contained therein. Metallizied layer 22 may be a metal foil, such as an aluminum foil, or a metallized film, such as aluminized plastic film. Outer layer 26 acts as a barrier between the environment and the corrosion inhibiting composition and also protects the metallized film from prematurely breaking. Typically, metal foils or films, such as metallizied layer 22, prohibits vapor permeation to a greater extent than plastic films.

Multi-layer 20 desirably substantially seals the corrosion inhibiting composition 10 and is designed to be easily removable. Such a layer need not entirely seal the corrosion inhibiting composition 10 to be effective. For example, when an end of the corrosion inhibiting composition 10 is not sealed, such as where a segment is cut away for use, such an exposed end will generally not substantially degrade the inhibiting tendency of the present invention. The inhibiting composition will remain substantially useful as long as other portions, such as the lengthwise portion, of corrosion inhibiting composition 10 remains sealed. Alternatively, the exposed end may be sealed by covering it with a sealing film or device, which may, for example, be the same as multi-layer film 20.

Figure 4:
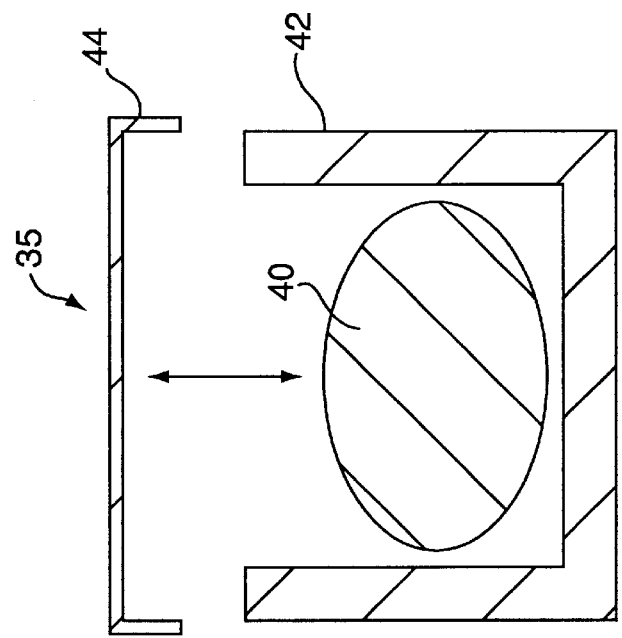
FIG. 4 is an exploded view of a resealable container storing an alternate form of the corrosion inhibiting product.

In another embodiment, a corrosion inhibiting product 35 consists of corrosion inhibiting composition 40 that is be placed in a resealable tub 42. As depicted in FIG. 4, cover 44 seals tub 42 to prevent premature vaporization of the corrosion inhibitor container therein.

The corrosion inhibiting composition of the present invention is most effective when placed proximal to a metallic object to be protected. Upon removing the corrosion inhibitor composition from its container or packaging, such as multi-layer film 20 or resealable tub 42, the corrosion inhibitor will vaporize at ambient conditions. To protect metallic surfaces corrosion inhibitors work best in a defined or contained vapor space. For example, a metallic object placed within a wrapping of plastic will protect the metallic object from the environment, such as humidity. A corrosion inhibitor placed within the wrapping will vaporize and effect metallic surfaces within the enclosure. The present invention may suitably be used within a number of enclosures, including but not limited to plastic wrapping, paper wrapping, paper containers, glass containers, plastic containers, wooden boxes, etc.

To protect metallic surfaces with these enclosures corrosion-inhibiting compositions 10 or 40 may be removed from their sealing device and placed on any convenient surface within the enclosure defining the vapor space. Such a surface may be an interior surface of the container holding the metallic item or may be a surface on the metallic item itself. A selected quantity of corrosion inhibiting composition can be made by simply cutting a particular length of corrosion inhibiting composition 10 or by removing a particular amount of corrosion inhibiting composition 40 from resealable tub 42. A spatula or any other well-known device can be used to remove the corrosion inhibitor from the resealable tub. The quantity of corrosion inhibiting composition selected will depend on many factors, including but not limited to concentration of corrosion inhibitor, type of corrosion inhibitors selected, surface area of corrodible metallic surface, volume of vapor space in which the corrodible item is contained, permeability of the enclosure encompassing the corrodible item and environmental conditions (moisture, corrosive gases, and the like).

The corrosion inhibiting composition of the present invention may also be used to protect surfaces within a cavity or bore of a metallic surface without the use of any additional enclosure or wrapping materials. The corrosion inhibiting composition could be pliably deformed to cover a cavity of a metallic object. Corrosion inhibitor will vaporize into the cavity to afford protection and the base material itself will also act as a barrier against the environmental elements, such as humidity.

To further protect metallic devices the base material 12 of the present invention may also contain a desiccant or a moisture absorbing compound, such as desiccant 16. As used herein the term "desiccant" or "moisture absorbing compound" refer to a class of compounds that provide a drying mechanism by physical absorption of water or by chemically reacting with water to form a hydrate or a new compound. For example, molecular sieve zeolites consist of a crystalline framework of aluminosilicates, often containing alkali metal cations, that provide high porosity structures for absorbing moisture. Water is removed by physical absorption as shown below.

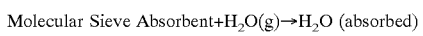

Molecular Sieve Absorbent+$H_2O(g)$→$H_2O$ (absorbed)

A chemical reacting desiccant, such as calcium chloride, reacts with water to form a hydrate. The desiccant 16 may be selected from silica gel; molecular sieve zeolites; activated clays, such as a montmorillonite clay; activated alumina; anhydrous calcium sulfate; anhydrous calcium chloride; anhydrous calcium bromide; anhydrous lithium chloride; anhydrous zinc chloride; anhydrous barium oxide; anhydrous calcium oxide and combinations thereof Other desiccant materials are contemplated for use herein as well.

Any quantity of corrosion inhibitor sufficient for effectuating corrosion protection of metallic objects is useful in the inventive composition. Desirably, the quantity of corrosion inhibitor is from about 0.1% to about 90% by weight of the total inventive composition. More desirably, corrosion inhibitors are present from about 2% to about 30% by weight of the total inventive composition.

Furthermore, the base material may contain a color indicator 18, which may also be referred to as a moisture absorbing indicator. Color indicator 18 changes color as it is exposed to and absorbs moisture. Sufficient quantities of the color indicator 18 should preferably be present to make the color change consistent with either the exhaustion of the desiccant 16 and/or the corrosion inhibitor 14. The moisture absorbing indicator is selected from any organic or inorganic material, such as metallic salts, that changes color upon absorbing moisture. Nonlimiting examples of materials that can be used as a moisture absorbing indicator are cobalt chloride, cobalt iodide, cobalt bromide, cobalt thiocyanate and p-hydroxynitrobenzene and combinations thereof. An example of one moisture absorbing indicator useful in the present invention is cobalt chloride ($CoCl_2$). Anhydrous cobalt chloride is blue. As the indicator is exposed to and absorbs moisture, the compound changes from a blue color to a red color, which indicates the presence of cobalt chloride hexahydrate ($CoCl_2 \cdot 6H_2O$) as illustrated below.

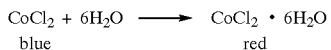

Preferably, the moisture absorbing indicator anhydrous is present from about 2 percent to about 10 percent by weight based on the amount of the desiccant in the formulation or from about 0.1 to about 1% by weight of the total inventive composition.

Features of the present invention are further described below in the following examples:

EXAMPLES

Example 1

A putty-like base material is prepared from the following composition:

| Rosin: | Base Material, Wt % |
|---|---|
| Modified Rosin | 30–35 |
| Kaolin Clay | 50–55 |
| Isopropyl Alcohol | 10–15 |
| Pigment | 1 |

The composition is based on weight percent of base material including other materials, such as fillers, pigments, organic solvents, tackifiers, and the like. The base material exhibits tackiness and viscoelastic and/or viscoplastic characteristics.

Example 2

A putty-like base material is prepared from the following composition:

| Bituminous: | Base Material, Wt % |
|---|---|
| Asphalt | 30–40 |
| Butyl Rubber | 10–35 |
| Polybutene | 0–10 |
| Tackifier | 1–20 |
| Clay | 10–15 |
| Calcium Carbonate | 10–15 |

The composition is based on weight percent of base material including other materials, such as fillers, pigments, organic solvents, tackifiers, and the like. The base material exhibits tackiness and viscoelastic and/or viscoplastic characteristics.

Example 3

A putty-like base material is prepared from the following composition:

| Unmodified Oleoresinous Putty/Caulk: | Base Material, Wt % |
|---|---|
| Linseed/Soy (vegetable) Oils | 7–12 |
| Calcium Carbonate (CaCO$_3$) | 85–90 |
| Mineral Spirits | 1–2 |
| Talc | 1–2 |
| Soya fatty acid | 0.3 |

The composition is based on weight percent of base material including other materials, such as fillers, pigments, organic solvents, tackifiers, and the like. The base material exhibits tackiness and viscoelastic and/or viscoplastic characteristics.

Example 4

A putty-like base material is prepared from the following composition:

| Polybutene Modified Oleoresinous Putty/Caulk: | Base Material, Wt % |
|---|---|
| Linseed/Soy (vegetable) Oils | 5–7 |
| Calcium Carbonate (CaCO$_3$) | 85–90 |
| Mineral Spirits | 1.5 |
| Talc | 1.2 |
| Soya fatty acid | 0.3 |
| Cobalt Naphthenate | 0.02 |
| Polybutene | 2–5 |

The composition is based on weight percent of base material including other materials, such as fillers, pigments, organic solvents, tackifiers, and the like. The base material exhibits tackiness and viscoelastic and/or viscoplastic characteristics.

Example 5

A putty-like base material is prepared from the following composition:

| Acrylic Resins: | Base Material, Wt % |
|---|---|
| Dimethacrylate esters | 70–75 |
| High boiling Methacrylate Esters | 15–20 |
| Hydroxyalkyl Methacrylate | 5–10 |
| Nonionic Surfactant | 2–5 |

Substituted Nitrile <0.5

The composition is based on weight percent of base material including other materials, such as fillers, pigments, organic solvents, tackifiers, and the like. The base material exhibits tackiness and viscoelastic and/or viscoplastic characteristics.

Example 6

A putty-like base material is prepared from the following composition:

| Vinyl Acetate -ethylene: | Base Material, Wt % |
|---|---|
| Vinyl acetate-ethylene latex, 55% solids | 38 |
| Fillers & Pigments | 54 |

-continued

| Vinyl Acetate -ethylene: | Base Material, Wt % |
|---|---|
| Other additives | 8 |

The composition is based on weight percent of base material including other materials, such as fillers, pigments, organic solvents, tackifiers, and the like. The base material exhibits tackiness and viscoelastic and/or viscoplastic characteristics.

Example 7

Corrosion inhibitors, as listed below, are combined into the base materials of examples 1 through 6. Corrosion inhibitors are included from about 1% to about 30% on a weight basis of the total composition. The composition retains its putty-like characteristics and releasably contains the corrosion inhibitors therein.

Corrosion inhibitors:

sodium nitrite;

dicyclohexylamine;

sodium benzoate;

hexadecylpyridinium iodide, dodecylbenzyl quinolinium bromide, propargyl quinolinium bromide;

cyclohexylammonium benzoate and ammonium benzoate;

dicyclohexylammonium nitrite and dicyclohexylamine chromate;

benzotriazole;

sodium dinonylnaphthalene sulfonate, triethanolamine dinonylnaphthalene sulfonate, calcium dinonylnaphthalene sulfonate, magnesium dinonylnaphthalene sulfonate, barium dinonylnaphthalene sulfonate, zinc dinonylnaphthalene sulfonate, lithium dinonylnaphthalene sulfonate, ammonium dinonylnaphthalene sulfonate, ethylenediamine dinonylnaphthalene sulfonate, diethylenetriamine dinonylnaphthalene sulfonate and 2-methylpentanediamine dinonylnaphthalene sulfonate; and sodium molybdate.

Thus, while there have been described the preferred embodiments of the present invention, those skilled in the art will realize that other embodiments can be made without departing from the spirit of the present invention, and it is intended to include all such further modifications and changes as come within the true scope of the claims set forth herein.

What is claimed:

1. A composition for inhibiting corrosion of a corrodible item comprising:

a pliable deformable base material having a putty-like consistency and capable of being attached to a surface in vapor communication to said corrodible item; and a vaporizable material contained within said base material and which releases a vapor phase inhibiting compound to inhibit corrosion of said corrodible item.

2. The composition of claim 1 wherein said base material is ambient-temperature deformable.

3. The composition of claim 1 wherein said base material is adhesively tacky to secure said base material to said surface.

4. The composition of claim 1 wherein said base material is from about 20% to about 90% by weight of the total composition and said corrosion inhibitor is from about 2% to about 30% by weight of the total composition.

5. The composition of claim 1 wherein said base material is selected from the group consisting of silicones, fluorosilicones, polyurethanes, polysulfides, polybutylenes, polyvinyl chloride, acrylic resins, vinyl acetate, ethylene vinyl acetate, vinyl acrylic, styrene butadiene rubber, styrenic block copolymers, oleoresinous compositions, bituminous, rosin, polybutadiene, polyisoprene, polychloroprene, polyisobutylene, ethylene propylene diene monomer rubber, ethylene-propylene copolymers, nitrile-butadiene rubber and polybutene and combinations thereof.

6. The composition of claim 1 wherein said vaporizable material is a solid, a liquid, or combinations thereof.

7. The composition of claim 1 wherein said vaporizable material is selected from the group consisting of nitrites, benzoates, sulfonates, primary amines, secondary amines, tertiary amines, diamines, aliphatic polyamines, ethers, salts of quaternary ammonium compounds, amine salts, aromatic amines, nonaromatic heterocyclic amines, heterocyclic amines, alkanolamines, substituted alkanolamines, thiols, thioethers, sulfoxides, thiourea, substituted thioureas, substituted thiocarbonyl esters, phosphonium salts, arsonium salts, phosphates, sulfonates, molybdates, corresponding salts and combinations thereof.

8. The composition of claim 1 wherein said vaporizable material is selected from the group consisting of sodium nitrite, dicyclohexylamine, sodium benzoate, hexadecylpyridinium iodide, dodecylbenzyl quinolinium bromide, propargyl quinolinium bromide, cyclohexylammonium benzoate, ammonium benzoate, dicyclohexylammonium nitrite and dicyclohexylamine chromate, benzotriazole, sodium dinonylnaphthalene sulfonate, triethanolamine dinonylnaphthalene sulfonate, calcium dinonylnaphthalene sulfonate, magnesium dinonylnaphthalene sulfonate, barium dinonylnaphthalene sulfonate, zinc dinonylnaphthalene sulfonate, lithium dinonylnaphthalene sulfonate, ammonium dinonylnaphthalene sulfonate, ethylenediamine dinonylnaphthalene sulfonate, diethylenetriamine dinonylnaphthalene sulfonate, 2-methylpentanediamine dinonylnaphthalene sulfonate, sodium molybdate, corresponding salts and combinations thereof.

9. The composition of claim 1 further including includes a moisture absorbing compound combined with said base material.

10. The composition of claim 9 wherein said moisture absorbing compound is selected from the group consisting of silica gel; molecular sieve zeolites; activated clays, such as a montmorillonite clay; activated alumina; anhydrous calcium sulfate; anhydrous calcium chloride; anhydrous calcium bromide; anhydrous lithium chloride; anhydrous zinc chloride; anhydrous barium oxide; anhydrous calcium oxide and combinations thereof.

11. The composition of claim 9 further including a moisture absorbing indicator combined with said base material.

12. The composition of claim 11 wherein said moisture absorbing indicator is cobalt chloride, cobalt iodide, cobalt bromide, cobalt thiocyanate and p-hydroxynitrobenzene and combinations thereof.

* * * * *